United States Patent [19]

Payne et al.

[11] Patent Number: 4,703,728
[45] Date of Patent: Nov. 3, 1987

[54] LIQUID DISPENSERS

[76] Inventors: Andrew L. Payne, 31 Kitenui Avenue, Mt. Albert, Auckland; Conrad F. Barber, 14 Fancourt Street, Meadowbank, Auckland, both of New Zealand

[21] Appl. No.: 835,376

[22] Filed: Mar. 3, 1986

[30] Foreign Application Priority Data

Mar. 4, 1985 [NZ] New Zealand ........................ 211292

[51] Int. Cl.⁴ ............................................. F02M 25/06
[52] U.S. Cl. ............................ 123/198 A; 123/25 R; 123/25 L; 123/196 M
[58] Field of Search ................ 123/25 L, 198 A, 25 R, 123/25 A, 196 M

[56] References Cited

U.S. PATENT DOCUMENTS

| 1,324,284 | 12/1919 | Todd | 123/25 L |
|---|---|---|---|
| 1,325,381 | 12/1919 | Silver . | |
| 1,610,508 | 12/1926 | Foley | 123/25 A |
| 1,983,066 | 12/1934 | Black . | |
| 2,073,887 | 3/1937 | Strancke | 123/25 L |
| 2,204,277 | 6/1940 | Leigh . | |
| 2,388,085 | 10/1945 | Russell | 123/198 A |
| 2,614,550 | 10/1952 | White . | |
| 2,711,725 | 6/1955 | Kovacs | 123/198 A |
| 2,722,210 | 11/1955 | Koonce | 123/198 A |
| 2,965,085 | 12/1960 | Kahler | 123/198 A |
| 2,972,342 | 2/1961 | Owen | 123/198 A |
| 3,509,967 | 5/1970 | Ballard . | |
| 3,664,314 | 5/1972 | Lamkin . | |
| 3,834,365 | 9/1974 | Ussery . | |
| 4,336,772 | 6/1982 | Young et al. | 123/25 L |
| 4,528,948 | 7/1985 | Ashmore | 123/25 L |

FOREIGN PATENT DOCUMENTS

| 702259 | 1/1941 | Fed. Rep. of Germany | 123/25 L |
|---|---|---|---|
| 550318 | 3/1923 | France | 123/25 L |
| 1086280 | 2/1955 | France | 123/198 A |
| 169054 | 9/1921 | United Kingdom | 123/25 L |

Primary Examiner—Ira S. Lazarus
Attorney, Agent, or Firm—Graybeal, Jensen & Puntigam

[57] ABSTRACT

A liquid dispensing device particularly suitable for automatically dispensing a lubricant to the combustion zones of an internal combustion engine. A sealed lubricant reservoir conjoins with an air and liquid blending chamber formed by a housing. The housing is sealed save for a minute air bleed aperture. An inlet to the chamber for the liquid is provided in an upper part of the housing and an outlet from the chamber provided in a lower part of the housing. The outlet is set up higher than a lower extremity of the chamber such that the outlet operates as a weir. The outlet conjoins with a turbulating device comprised of an axially adjustable pin having an external helical groove. The pin is mounted in a bore conjoining with a conduit to a required dispensing port, for example, in an inlet manifold of an engine. Inlet manifold vacuum draws lubricant from the reservoir via the air with lubricant blending chamber and the turbulating device.

7 Claims, 2 Drawing Figures

LIQUID DISPENSERS

BACKGROUND OF THE INVENTION

This invention relates to liquid dispensers and in particular relates to a lubricant dispenser for the automatic dispensing of a controlled quantity of lubricating liquid to a negative pressure zone of an internal combustion engine.

It is recognized that problems can arise with internal combustion engines where insufficient lubrication is provided to the combustion zones of an engine's cylinders. This can occur for various reasons, an important one being on incorrect fuel to air mixture. If this is too lean, that is, insufficient fuel, this can cause overheating, resulting in adverse consequences. A direct consequence of overheating is the destruction of lubricant within the zone, which in turn leads to attrition problems arising between various components within the zones. Enriching the fuel mixture in part overcomes this problem. However, adverse consequences arise one of which is increased fuel consumption. Accordingly, it is well known that it is important that the correct fuel/air mixture be provided to achieve the correct running of an internal combustion engine.

It follows that in feeding the fuel to the combustion zones, whether it be by way of carburetor or fuel injection devices, it is critical that air leaks be eliminated otherwise the integrity and in particular, the uniformity of the fuel mix cannot be maintained. This problem is compounded as the fuel demands of an engine vary considerably, depending upon the operating conditions thereof, and various adjustments and adjunct means are provided to maintain the fuel/air mixture commensurate to those demands.

A fundamental of an internal combustions engines' operation and in particular, the achieving of the fuel/air mixture discussed above, is the vacuum created by the engine's pistons being displaced. This is utilised to draw in the required air for mixing with the fuel. This vacuum is also utilised in other ways, including operating, in known manner, advance and retard mechanisms to maintain the correct parameters for the engine's operation including the fuel/air mixture. Our dispenser, as with those known to us for achieving the automatic or ongoing lubrication of the upper cylinder zones of an internal combustion engine utilise this vacuum to achieve operation. The relevant prior art known to us comprises U.S. Pat. Nos. 1,325,381 Silver; 1,983,066 Black; 2,204,277 Leigh; 2,614,550 White; 3,509,967 Ballard; 3,664,314 Lankin and 3,834,365 Ussery. As we understand them, all these devices vary considerably from our device with the latter three having quite different requirements and applications. The others vary in numerous ways from our device, both as to structure and operation. Our device, we believe, is more versatile in its application, not only in the range of motor sizes for which it is suitable for use with but also with different fuelling systems, that is, carburetor or fuel injection systems. Further, inlet porting or entry for our device can be provided in several places, the device thus being particularly adaptable as to installation. A particular problem that we believe exists with the known devices, is the extent of "air bleed" they require for operation. This must bear adversely on the fuel/air mixture, in particular the uniformity requirements thereof, as the engine operating conditions vary. As a corollary of this, it would appear that there is considerable variation in the amount of oil being dispensed by these known devices. An object of our invention is to provide an improved liquid dispensing device particularly suitable for lubrication of upper cylinder zones of internal combustion engines which will at least partly overcome the problems of known devices. In particular it has been found that the device has little, if any, affect on the fuel/air mixture and the vacuum characteristics of an engine. The device can be operated over a wide range of vacuums from in the order of one inch and even less of vacuum to over twenty inches of vacuum.

BRIEF SUMMARY OF THE INVENTION

According to a first aspect of this invention, there is provided a liquid dispenser comprising a sealable reservoir element to contain a quantity of a dispensing liquid, a supply passageway to connect the reservoir to an air blending chamber defined by a housing with the supply conduit being mounted through an upper end of the housing to terminate as an inlet to the chamber, the housing incorporating an outlet port disposed lower than the inlet thereto, and an air bleed aperture extending through the housing and disposed clear of a lower extremity thereof, a liquid with air turbulating device mounted to conjoin with and downstream of the outlet and conjoining the outlet to a feed conduit adapted at a distal end thereof to conjoin with vacuum means whereby, in operation, the vacuum means will draw liquid from the reservoir and facilitate an ingress of air into the air blending chamber to achieve an air and liquid mix discharge therefrom which, in turn, tends to be vaporised with passage through the turbulating device.

In a further aspect of this invention there is provided an engine upper cylinder lubricating dispenser comprising a sealable but rechargeable reservoir element to contain a quantity of lubricating liquid, a supply conduit to connect the reservoir to an air blending chamber defined by a housing with the supply conduit being mounted through an upper end of the housing to terminate as an inlet within the chamber spacially clear of the housing, the housing incorporating an outlet port disposed through an upstand forming part of the bottom of the chamber and positioned clear of the side wall of the housing to thus form the outlet as a weir in relation to the surrounding lower section of the chamber, an air bleed aperture formed through the housing upwardly of the weir outlet, a liquid-with-air turbulating device mounted to conjoin with and downstream of the outlet, the turbulating device comprising a helically grooved element axially adjustable within a bore of a junction fitting conjoining the outlet to a feed conduit adapted at a distal end thereof to conjoin with an engine component appropriate to provide a vacuum to the lubricating device to thereby provide a supply of lubricant to the upper cylinder regions of that engine, whereby in so doing, the lubricant is drawn firstly into the chamber to blend with air ingressing thereinto to discharge therefrom as an air and liquid mix which tends to become vapourised with subsequent passage along the helical groove of the turbulating device.

BRIEF DESCRIPTION OF THE DRAWINGS

In further describing the invention reference is made to the accompanying drawings of a preferred embodiment and wherein.

DETAILED DESCRIPTION OF THE PREFERRED EMBODIMENT

Figure 1:
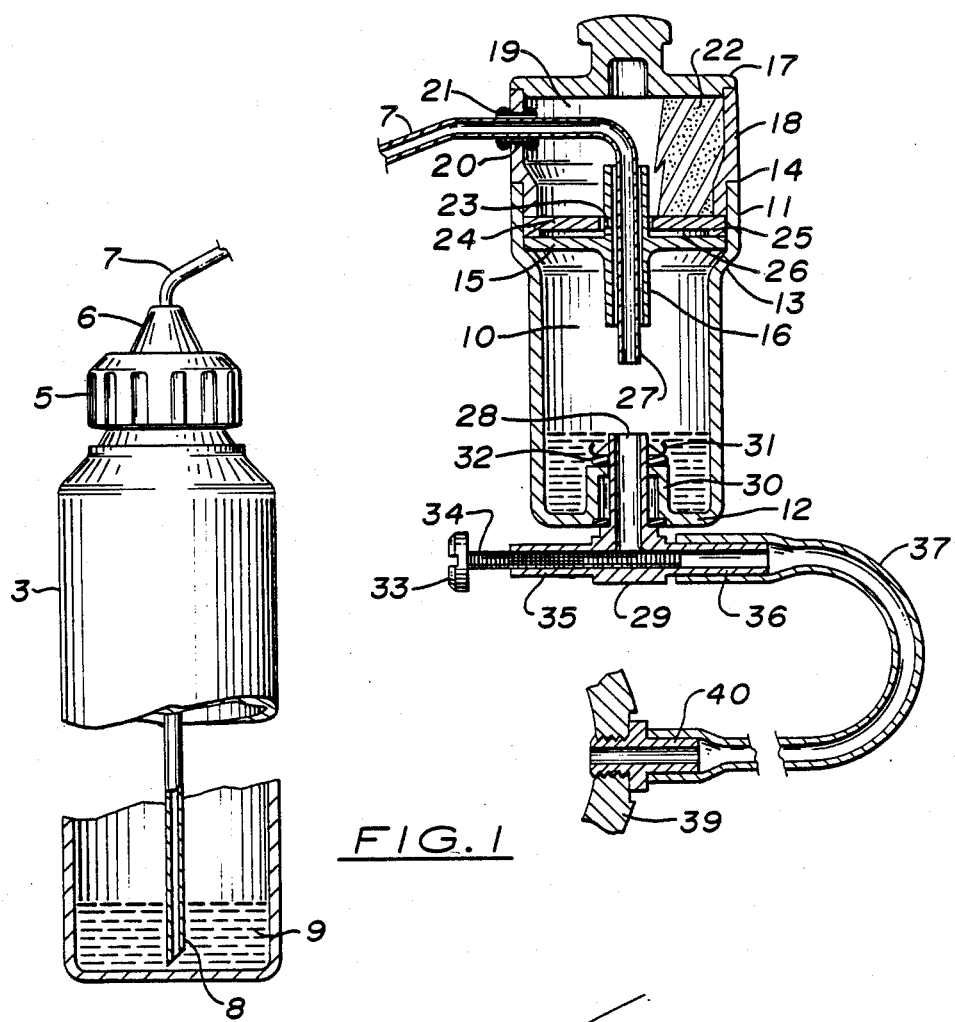
FIG. 1 is a truncated partly schematic and partly cross-sectional view of the dispensing device and FIG. 2 is a perspective schematic view of the device fitted to a vehicle's engine.

A liquid reservoir element 3 is preferably in the form of a cylindrical plastic bottle having a screw top 5 incorporating a conical shaped upper end 6. Upper end 6 sealingly retains a conduit 7 therethrough with conduit 7 preferably terminating within reservoir bottle 3 adjacent the bottom thereof. Preferably the lower end 8 of conduit 7 is cut at an angle to facilitate the drawing-off of liquid 9 within bottle 3. Conduit 7 forms a liquid supply passageway to a chamber 10 formed by a housing 11. Housing 11 is preferably of a cylindrical configuration open at an upper end and integrally incorporating a lower end 12. The upper end of housing 11 is preferably formed with a shoulder 13 set back from the terminating lip 14 thereof to enable an upper end plate 15 to be seated in the upper end of housing 11. End plate 15 is preferably also moulded from plastics material to be of a generally disc shape and integrally incorporates a hollow stem 16 extending from both faces thereof. In assembly end plate 15 is sealed about the periphery thereof to the associated wall section of housing 11. Stem 16 retains the end of conduit 7 as more particularly described hereinafter.

Preferably a cap 17 incorporating a peripheral skirt 18 seats on the upper lip 14 of the housing 11 to form a cavity 19 thereabove. An aperture 20 is preferably formed through skirt 18 of cap 17 provide entry for conduit 7. Conduit 7 is loosely retained within aperture 20 by grommet 21. This mounting is made sufficiently loose to form an air vent. Preferably an air filter element 22 for example an appropriately shaped piece of open cellular foamed plastic material (depicted truncated) is retained in cavity 19.

A minute air bleed aperture 23 is formed through the wall of upper stem section 16 to conjoin the bore of stem 16 with a cavity 19. The diameter of aperture 23 is critical at least to the extent of being less than 0.8 mm in diameter. To facilitate maintaining it clear a packing disc 24 incorporating a central aperture seats over upper stem 16 and is retained on upper end plate 15 by the mounting of cap 22 to housing 11 as depicted. In assembly plate 24 and cap 22 are sealingly retained to the associated wall section of housing 11 in the same manner as upper end plate 15. The bore of plate 24 is marginally oversize relative to the diameter of upper stem 16 and the underside of plate 24 incorporates a peripheral shoulder 25. Thus a small cavity 26 is formed between the upper face of end plate 15 and the lower face of plate 24. Cavity 26 aligns with aperture 23 this together with the oversize nature of the fitting of plate 24 to stem 16 maintaining the venting of aperture 23 to atmosphere via the filter incorporating cavity 19 and the loose fitting of conduit 7 within grommet 21.

The mounting of the end section of conduit 7 within stem 16 is also of a loose fit nature and preferably the inlet forming end 27 of conduit 7 terminates clear stem 16 and also spacially clear of the remainder of housing 11. By this loose fit of conduit 7 within stem 16 chamber 10 conjoins with aperture 23.

At the lower end 12 housing 11 incorporates an outlet 28, outlet 28 being formed by a trunk section of a inverted "T" shaped bore incorporating fitting 29. Preferably lower end 12 of housing 11 incorporates an upstanding section 30 through the upper extremity of which the trunk of fitting 29 extends and is retained such as by way of a spring clip 31 preferably in conjunction with an associated sealing washer 32. Thus the lower extremity of chamber 10 is set at a level lower than the entry to outlet 28 and in use liquid from reservoir 3 settles therein to eventually discharge into outlet 28 in the manner of a weir.

Preferably as depicted the stem 16 and the outlet 28 are centrally disposed and preferably housing 11 is formed from a transparent material to thus also act as a sight glass. It is appreciated that some liquid will pass directly from the inlet end 27 to outlet 28 however this is not critical to the function of the device the majority of the liquid enters the outlet via the weir arrangement as aforesaid. It will be appreciated that this configuration at the lower end of housing 11 also serves as a sediment trap.

Fitting 29 retains a turbulating device 33 which is preferably in the form of a needle element incorporating an external helical groove depicted as screw-thread 34. For convenience a conventional screw is used as the turbulating device 33 it being screw-threaded into a first cross limb 35 of fitting 29 sufficiently to extend at least partly into a second cross-limb 36 thereof and more particularly past the junction with the trunk forming outlet 28. It is found that this helical groove configuration provides substantial turbulence to the mix of the liquid with air discharging from chamber 10 into outlet 28 and toward feed conduit 37 to the extent that substantial vaporisation results. Additionally, by axially adjusting the amount turbulating device 33 extends into the bore 36 the dispensing rate can be controlled, further insertion of the turbulating device 33 decreasing the dispensing rate.

Figure 2:
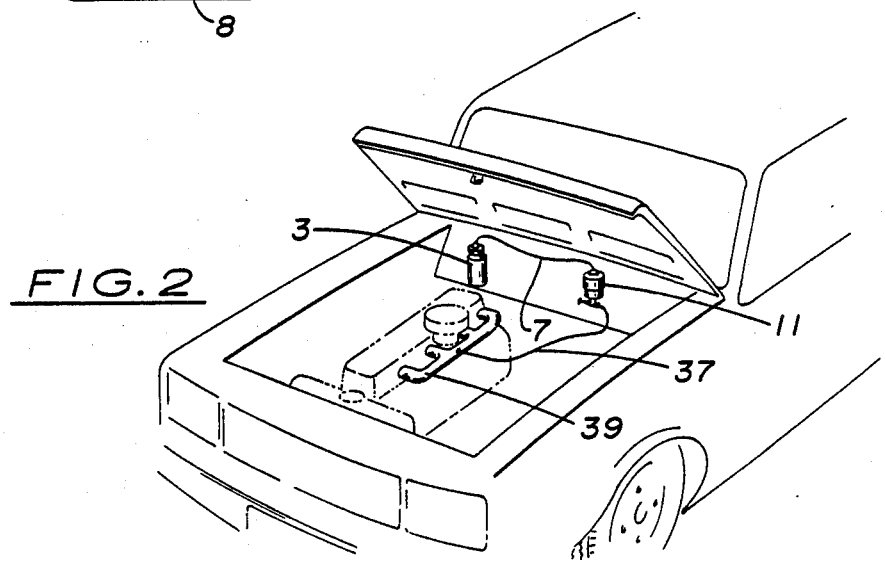

A feed conduit 37 couples to limb 36 of fitting 29 and extends therefrom to the required discharge port. Referring in particular to FIG. 2, in a preferred embodiment the dispenser is utilised as an engine upper cylinder lubricating dispenser and feed conduit 37 is coupled to an inlet manifold 39. To that end a suitable adaptor 40 can be provided. However often a suitable coupling point already exists on an engine's inlet manifold 39. Depending upon the engine, feed conduit 37 can be coupled to an existing vacuum line of an engine's intake manifold such as may be utilised to operate and advance and retard mechanism. In mounting the device to an engine the positioning of housing 11 and in particular inlet 27 needs to be above a maximum upper level of liquid 9 within reservoir 3 to avoid syphoning developing.

Thus this engine upper cylinder lubricating device is readily fitted to an engine and by providing that housing 11 is transparent the draw-off rate of lubricant 9 from reseroir 3 can be observed exiting into chamber 10 and be readily adjusted by adjusting turbulating device 33. It is found that if this structure providing the draw-off is set when maximum vacuum exists at the inlet manifold then even with a substantial reduction of that vacuum the draw-off of lubricant 9 remains substantially constant.

We claim:

1. A liquid dispenser comprising a sealable reservoir element to contain a quantity of a dispensing liquid,
   a supply passageway,
   a housing defining an air blending chamber, with said supply passageway connecting said reservoir to the chamber and being mounted through an upper end of said housing to terminate as an inlet to the chamber, said housing incorporating an outlet port diposed lower than the inlet thereto, and an air bleed aperture extending through said housing and disposed clear of a lower extremity thereof, means for turbulating and substantially vaporising a mixture of liquid with air, said turbulating means conjoining the outlet from the air blending chamber, and a feed conduit adapted at a distal end thereof to conjoin with variable vacuum means, wherein, in operation, the vacuum means draws liquid from said rerservoir and facilitates an ingress of air into the air blending chamber to achieve an air-and-liquid mix discharge therefrom which is substantially vaporised with passage through said turbulating means, and the rate of withdrawal thereof into the variable vacuum means remains substantially constant even with substantial reduction in vacuum.

2. A liquid dispenser as claimed in claim 1 wherein said turbulating means comprises a pin formed with an external helical groove, the pin being adjustably mounted axially within a bore of a fitting conjoining with the outlet of the housing to thereby impart helically oriented turbulence to the liquid-with-air mixture passing therealong.

3. A liquid dispenser as claimed in claim 2 wherein the outlet port is formed in an upper extremity of an upstand formed in the lower end of said housing and spaced clear of the surrounding wall of said housing to provide a section of the chamber lower than the outlet, whereby in operation the outlet acts as a weir, liquid within the lower section of the chamber spilling over into the outlet.

4. A liquid dispenser as claimed in claim 3 wherein the air bleed aperture is less than 0.8 mm in diameter and is formed through a wall of a hollow stem formed in an upaper end of said housing, a cap retaining a filter therewithin is sealingly retained over the upper end of said housing, and the supply passageway is formed by a conduit loosely located through an aperture in the cap and with its end section extending as a loose fit through the stem.

5. A liquid dispensing device as claimed in claim 1 wherein the housing is formed from a transparent material.

6. An engine upper cylinder lubricating dispenser comprising:

a sealable but rechargeable reservoir element for containing a quantity of lubricating liquid, a supply conduit, a housing defining an air blending chamber with said supply conduit connecting said reservoir to the chamber and being mounted through an upper end of said housing to terminate as an inlet within the chamber spacially clear of said housing, said housing incorporating an outlet port disposed through an upstand forming part of the bottom of said housing and positioned clear of the side wall of said housing to thus form the outlet as a weir in relation to a surrounding lower section of the chamber, said housing including an air bleed aperture having a diameter less than 0.8 mm and being formed through said the housing upwardly of the weir outlet, a liquid-with-air turbulating device mounted to conjoin with the outlet downstream thereof, said turbulating device comprising a helically grooved element axially adjustable within a bore of a junction fitting conjoining the outlet to a feed conduit adapted at a distal end thereof to conjoin with a variable vacuum engine component appropriate to provide a supply of lubricant to the upper cylinder regions of an engine, wherein the lubricant is drawn firstly into the chamber to blend with air ingressing thereinto, and secondly discharged therefrom as an air-and-liquid mix which is substantially vapourised with subsequent passage along the helical groove of said turbulating device, and the rate of withdrawal thereof into the variable vacuum engine component remains substantially constant even with substantially reduction in vacuum.

7. In a combustion engine installation the provision of an upper cylinder lubricating dispenser as claimed in claim 6 and wherein the inlet within the chamber is mounted higher than the upper lubricant level of the reservoir and wherein the feed conduit is coupled to a port in the inlet manifold of the engine.

* * * * *